US006953420B2

(12) United States Patent
Karbach

(10) Patent No.: US 6,953,420 B2
(45) Date of Patent: Oct. 11, 2005

(54) HEATED ROLLER FOR A HEATING DEVICE FOR WARMING A FILM STRIP COMPRISING THERMOPLASTIC PLASTIC

(75) Inventor: Helmut Karbach, Neckarsulm (DE)

(73) Assignee: Adolf Illig Maschinenbau GmbH & Co., Heilbronn (DE)

( * ) Notice: Subject to any disclaimer, the term of this patent is extended or adjusted under 35 U.S.C. 154(b) by 0 days.

(21) Appl. No.: 10/160,045

(22) Filed: Jun. 4, 2002

(65) Prior Publication Data

US 2002/0146478 A1 Oct. 10, 2002

Related U.S. Application Data

(63) Continuation of application No. 10/097,458, filed on Mar. 15, 2002, now abandoned.

(30) Foreign Application Priority Data

Mar. 16, 2001 (DE) ........................................ 101 12 736

(51) Int. Cl.[7] ............................ F28F 5/02; F16C 13/00
(52) U.S. Cl. ............................. 492/46; 492/38; 492/45
(58) Field of Search ............................ 492/46, 38, 45; 29/895.213, 895.2; 165/89, 90, DIG. 156

(56) References Cited

U.S. PATENT DOCUMENTS 1,209,736 A * 12/1916 Lueckenbach ............... 492/38
1,963,365 A * 6/1934 Herold ........................ 492/38
3,217,795 A * 11/1965 Cirrito ......................... 165/90
4,453,593 A * 6/1984 Barthel et al. ................ 165/89
5,690,300 A * 11/1997 Iannucci .................. 242/571.2
5,885,410 A * 3/1999 Berkan ........................ 492/46
6,006,806 A * 12/1999 Marschke ............. 29/895.213
6,018,870 A 2/2000 Marschke et al. ..... 29/895.213
6,113,059 A * 9/2000 Couillard .................... 248/694

FOREIGN PATENT DOCUMENTS

DE 3311988 C1 4/1984
DE 3539500 A1 5/1987
DE 9416804.0 2/1996
EP 0829693 A1 3/1998

* cited by examiner

*Primary Examiner*—Marc Jimenez
(74) *Attorney, Agent, or Firm*—Venable, LLP; Thomas G. Wiseman

(57) ABSTRACT

The heated roller of a heating device for warming a film strip comprising thermoplastic plastic is embodied to be manufactured less expensively, including its coating, even with a relatively large diameter. Moreover, it is lighter and can be brought to a more uniform temperature. This is accomplished in that the heated roller comprises a plurality individual segments that can be produced, including all holes, webs and grooves, from an aluminum alloy in an extrusion-molding process. A special clamping strip connects adjacent individual segments together to form the roller.

15 Claims, 3 Drawing Sheets

HEATED ROLLER FOR A HEATING DEVICE FOR WARMING A FILM STRIP COMPRISING THERMOPLASTIC PLASTIC

CROSS REFERENCE TO RELATED APPLICATION

This application is a continuation of U.S. patent application Ser. No. 10/097,458 filed Mar. 15, 2002, now abandoned.

This application claims the priority of German Patent Application No. 101 12 736.7 filed Mar. 16, 2001, which is incorporated herein by reference.

BACKGROUND OF THE INVENTION

The invention relates to a heated roller for a heating device for warming a film strip comprising thermoplastic plastic, wherein the roller has a tubular shape and is provided with holes or bores in its wall for inserting heating cartridges or providing passage for a heating medium.

German Patent No. DE 33 11 988 C1 discloses a heating device having heated rollers. It is known that these heated rollers comprise an aluminum alloy that is centrifugal-cast or chill-cast to form a tube having an outer diameter in the order of magnitude of 400 to 600 mm and a wall thickness of about 30 mm. A plurality of bores is cut into the circumference of the wall for mounting electrical heating cartridges. A temperature-control device is used to heat the heated rollers to a set temperature.

The surface of the heated rollers is preferably provided with a non-stick coating, such as Teflon® (polytetrafluoroethylene), to prevent the hot film from sticking, and to allow vapors formed by the film and dirt to be easily removed from the surface of the heated roller.

This type of heated-roller production is associated with numerous disadvantages. There are few manufacturers who are even willing or able to cast heated rollers in this diameter range because of the associated production problems. Because the finished rollers must have a clean, pore-free surface, slag inclusion and resulting porous spots inevitably lead to rejected products or time-consuming touch-up work. These porous spots are, however, practically unavoidable, and cannot be seen until the surface of the heated roller is machined—typically turned.

Creating the bores for the heating cartridges is extremely cost-intensive because the heated rollers must have a width of up to about 900 mm, depending on the width of the film strip to be heated. The bores must be relatively identical with respect to tolerance. A minimum size must be assured. Otherwise, the heating cartridges cannot be inserted. On the other hand, if the bores are too large, the heat transfer is non-uniform. The heated rollers then have an uneven temperature distribution. Such bores can only be produced with costly, special deep-hole boring machines. A risk associated with these machines is that the drill bit may travel beyond the defined length and puncture the thin roller wall. A different distance from the surface also results in a non-uniform temperature distribution.

The surface coating of the heated rollers is also problematic, because only a few manufacturers are capable of coating such large parts. Heated rollers must be handled carefully to avoid damage to the surface coating, which would stipulate a costly re-coating of the entire heated roller. This must be taken into consideration in the transport from the coating site to the user, during storage until installation, and during installation itself. Costly packaging is required between the coating process and the actual use. Suitable means of transport are also necessary. The large heated rollers also require a correspondingly large amount of storage space.

DE 35 39 500 A1 discloses a roller with which a film strip is heated in one segment, then cooled in a second segment. The roller comprises an outside ring and an inside ring, with webs between the two rings. The outside and inside rings are connected in one piece over the entire roller circumference. It can be assumed here, there is no description, that the parts are welded together. This roller does not permit the insertion of heating cartridges. It is also not possible to maintain a uniform roller temperature, with the use of a detector element, because the wall is too thin. The aforementioned coating-related problems also exist here, including the fact that it is impossible to exchange individual roller parts in the event of damage.

SUMMARY OF THE INVENTION

It is the object of the invention to avoid these drawbacks. Smaller components are to be used, which are easier to produce, transport, store and coat. The components are to be configured to be assembled to form a large heated roller. Precise bores, both in terms of diameter and the position relative to the surface, are to be provided for heating cartridges for permitting a uniform roller temperature. The material requirement, and thus the weight of the heated roller, are to be low, while the temperature consistency is improved and the heating time upon activation is shortened. The heated roller is to be significantly less expensive to produce.

To accomplish the object, according to the invention the heated rollers are produced or formed from individual elements that can be manufactured from an aluminum alloy in an extrusion-molding method because they are considerably smaller than the heated roller as a whole. These elements respectively form a partial region of the heated roller, seen at the circumference of the roller. The bores for the heating cartridges can be molded with the elements, which can be achieved with sufficient precision. The elements are provided with centering devices at the respective end surfaces, so the adjacent elements can be joined snugly. The elements can be cut off of the extrusion-molded profiles at arbitrary lengths, permitting the production of heated rollers of different widths. The individual elements of a heated roller can be exchanged, so that, in the case of damage to the coating, for example, the entire heated roller need not be re-coated. Because extrusion-molded profiles are extremely precise, it is not necessary to touch up the outside surface, which reduces costs. In this production method, there is no risk of porous regions in the surface of the heated roller.

According to a feature of the invention, the elements are embodied such that they are highly resistant to deformation, for example, during heating, and can be joined to each other and connected simply with a clamping profile.

The schematic drawings illustrate an exemplary embodiment of a heated roller having six elements, as well as advantageous embodiments.

DESCRIPTION OF THE PREFERRED EMBODIMENTS

Figure 1:
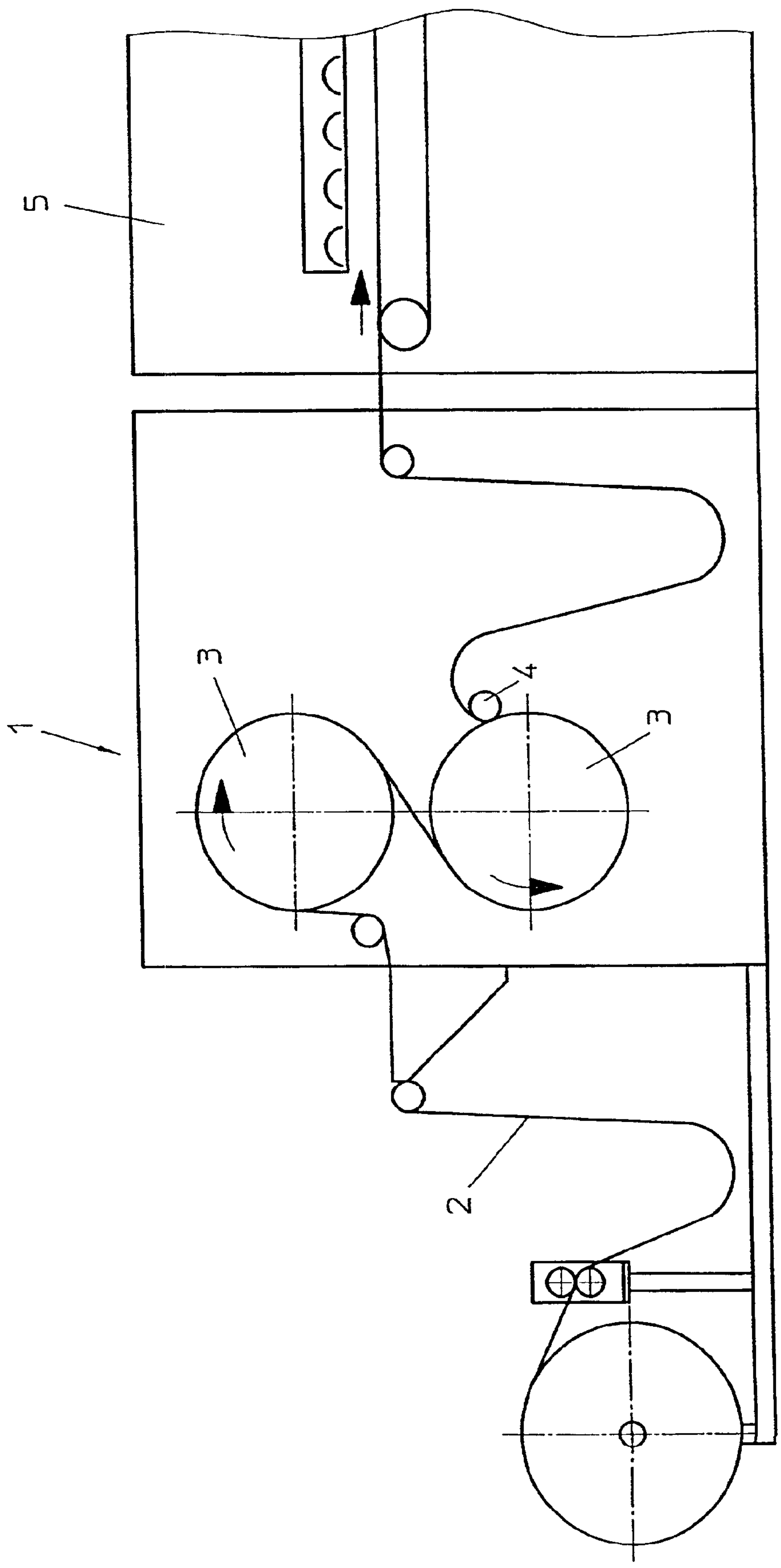
FIG. 1 is a fundamental representation of an entire heating device having two heated rollers.

FIG. 1 shows a heating device 1, which is supplied with a cold film strip 2 of thermoplastic plastic, and uses two heated rollers 3 to warm the strip 2. The heated film strip 2 is supplied to a thermoforming device 5, where it is heated more and deep-drawn through differential pressure to form containers or other molded parts. The use of such a heating device is advantageous with certain film materials and of a certain film thickness. Depending on the conditions, one to four heated rollers may be provided. All of the heated rollers are seated to rotate. A driven transport roller 4 effects the film transport as it presses against the last heated roller 3 in the passage direction.

Figure 2:
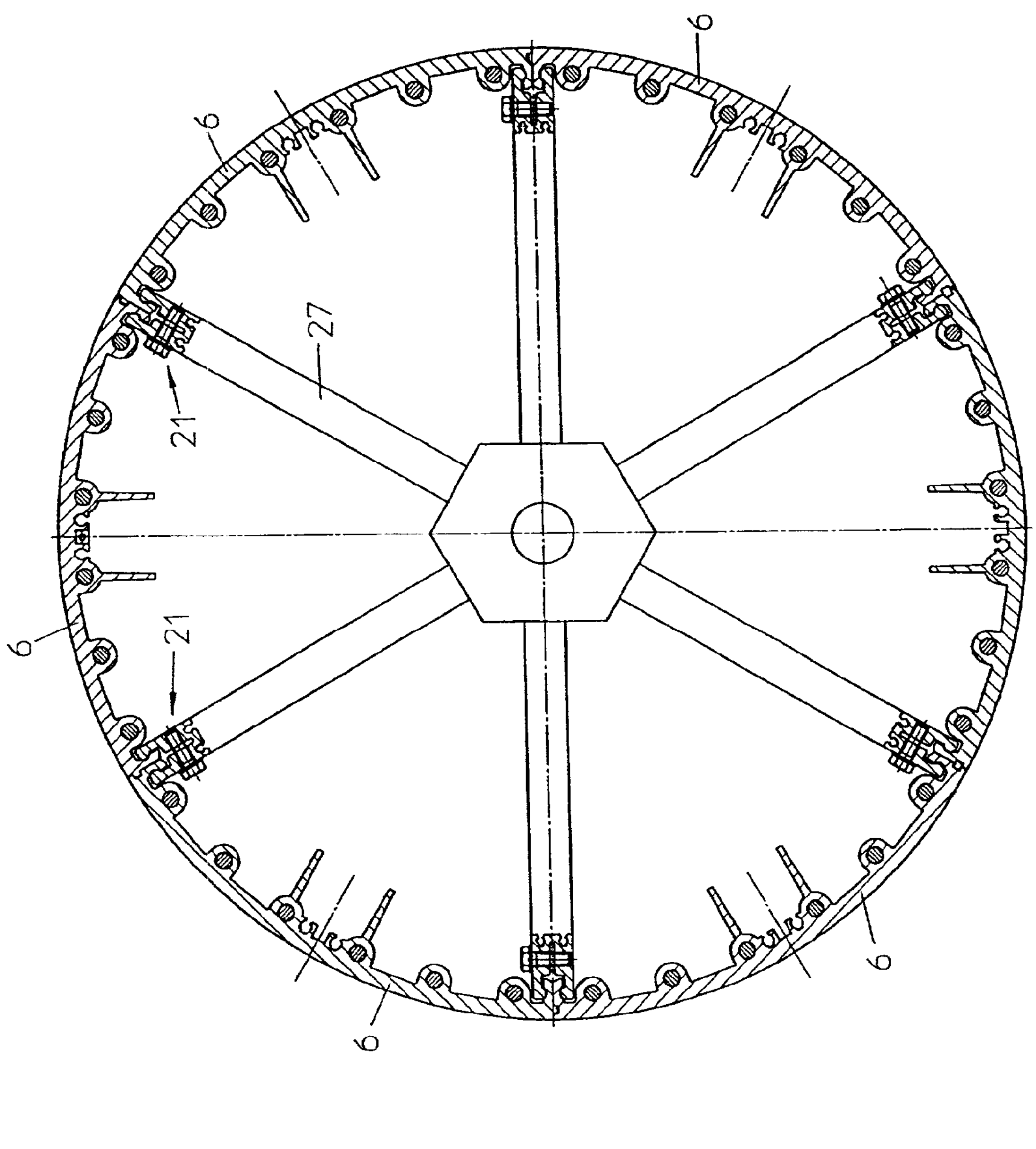
FIG. 2 shows a heated roller according to the invention comprising six elements.
Figure 3:
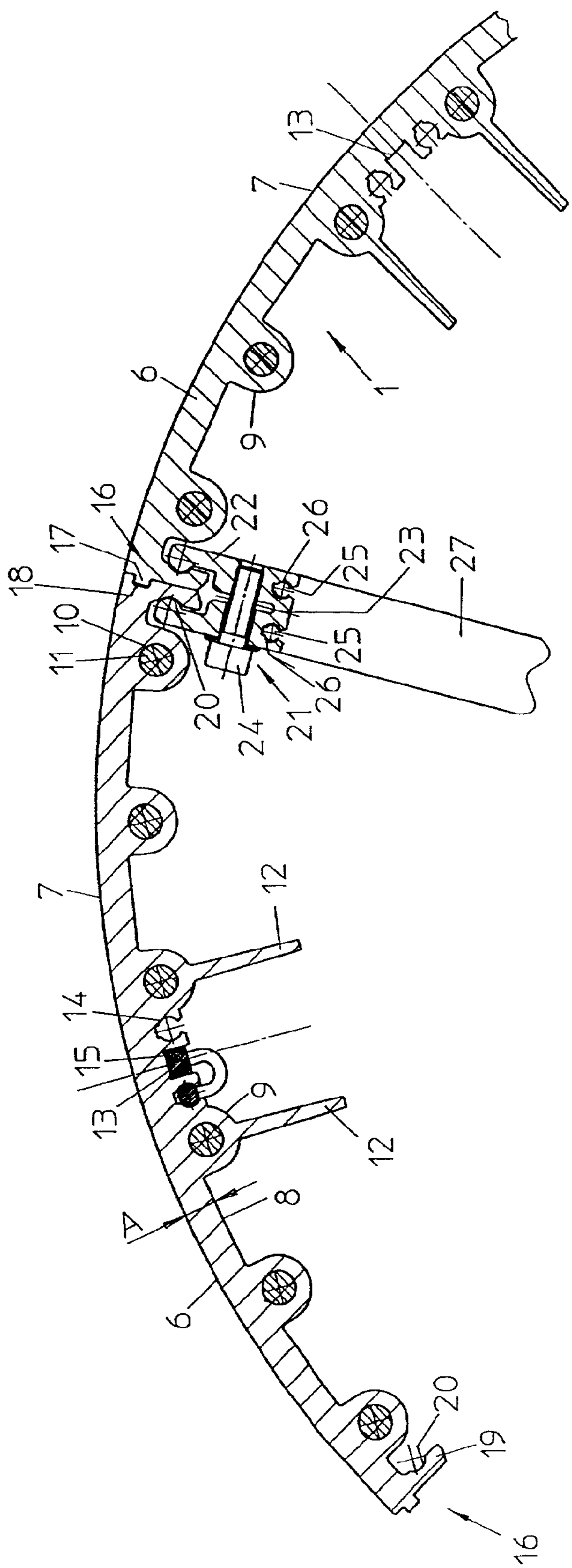
FIG. 3 shows on an enlarged scale, two roller forming elements that are connected by a clamping profile.

As shown in FIG. 2, each heated roller 3 comprises a plurality of similar, preferably structurally identical, elements 6. FIG. 2 shows a heated roller 3 constructed from six such structurally-identical elements 6, with each element 6 constituting a 60° portion of the roller circumference. FIG. 3 illustrates the structure of such an element 6, and the connecting point or connection between each pair of individual adjacent elements 6.

The outside surface 7 of an element 6 is adapted to the outer diameter of the heated roller 3. The inside surface 8 extends parallel thereto, at a distance A in a range of 10 to 40 mm constituting the roller thickness. The inside surface 8 has a plurality of inwardly directed radial bulbous protrusions 9, each of which has a bore 10 for receiving a heating cartridge 11 or for providing passage for a heating medium. Rib-like webs 12 provided on two or more of the protrusions 9 lend the element 6 a high rigidity.

At the center of each element 6, a groove 13 is cut into the inside surface 8. On both sides of this groove 13 is an undercut groove 14 that extends over the entire length of the element 6. The groove 14 serves to receive a temperature sensor 15 that is mounted at a desired location, for example, in the center. The electrical supply cable to this sensor 15 can be simply inserted into one of the grooves 14 and guided to the outside. The undercut structure of the groove 14 clamps the cable in the groove 14.

At the end faces 16 forming the connection site of two adjacent elements 6, each element 6 is provided with centering devices. For example, as shown, one end face 16 has a projection 17 for this purpose, while the other facing end face 16 has a corresponding or matching groove 18. In this way, both elements 6 are centered relative to one another at the connection site such that adjacent outer surfaces 7 join smoothly together. Another possible embodiment of the centering mechanism involves a V-shaped embodiment of the projection 17 and the groove 18.

In accordance with a feature of the invention, to connect the two end faces 16 of adjacent elements 6, the web portion 19 of each end surface 16 projecting inwardly beyond the inside surface 8 is provided with an indentation 20 on its side opposite the end surface 16, and a clamping strip 21 effects a connection using this indentation 20. This clamping strip 21 has two legs 22, which are shaped and spaced such that they each come to rest in a respective indentation 20. A web 23 connects the legs 22. Screws 24 extending transverse to the legs 22 serve in clamping the adjacent webs 19 together via the legs 22. Two indentations 25 having the same diameter as the core hole of a standard thread are worked into the underside of the web 23, so a thread 26 can be cut directly into the end face, if needed. The threads 26 serve in the assembly of end-face spokes 27, with which the entire heated roller 3 is suspended and supported. These clamping strips 21 extend either over the entire width of the heated roller 3 or in local regions. The cross-section of the elements 6 and the clamping strip 21 is identical over the entire length, so these parts, including bores 10, grooves 13 and indentations 14, 20, 26, can be manufactured from an aluminum alloy in an extrusion-molding process. The elements 6 and the clamping strips 21 are cut from these profile rods at the necessary lengths, and bores for screws 24 and the threads of these screws, as well as threads 26, are produced with little finishing.

With these relatively small dimensions of an element 6, it is readily possible to provide at least the outside surface 17 with a non-stick coating.

The invention now being fully described, it will be apparent to one of ordinary skill in the art that many changes and modifications can be made thereto without departing from the spirit or scope of the invention as set forth herein.

What is claimed is:

1. A heated roller for warming a thermoplastic film, said roller having a tubular shape with an inner and outer surface and heating cartridges or passages for a heating medium positioned along the inner surface for the substantially uniform warming of the thermoplastic film positioned on the outer surface, which has a nonstick coating between it and the thermoplastic film, and wherein said roller comprises a series of detachably connected one-piece elements of a light weight metal, each element having an inner surface and an outer non-stick coated surface and two longitudinal edges, each longitudinal edge has a centering device that comprises either a groove or a projection, which groove or projection cooperates with the corresponding projection or groove on an adjacent element to form a smooth surface between the adjacent elements, and a web, located on the inner surface of the element near the lateral edge, which cooperates with a web on an adjacent element to provide a detachable connection between the longitudinal edges of adjacent elements, wherein the elements collectively define the tubular shape and can be individually replaced with a new element and wherein the tubular structure is maintained when inserting the new element.

2. The heated roller according to claim 1, wherein the centering device comprises a rectangular cross-section projection and a rectangular groove, wherein the projection and groove form the detachable connection between the two adjacent elements.

3. The heated roller according to claim 1, wherein the centering device comprises a V-shaped cross-section projection, and a V-shaped groove, wherein the projection and groove form the detachable connection between two adjacent elements.

4. The heated roller according to claim 1, further comprising inwardly directed radially extending bulbous protrusions, located on the inner surface of each of the elements, which bulbous protrusions position the heating cartridges or the heating medium to provide for the uniform warming of the thermoplastic film positioned on the non-stick coated outer surface.

5. The heated roller according to claim 4, further comprising respective reinforcing webs disposed on the bulbous protrusions.

6. Heated rollers according to claim 1, wherein the web protrudes inwardly beyond the inner surface and a connection arrangement for the connection of adjacent elements provided in the vicinity of the web.

7. The heated roller according to claim 6, wherein the web has an indentation and the connection arrangement comprises a clamping strip, shaped to correspond to the indentation, surrounding two adjacent webs of two adjacent elements and engaging in the recesses of the two webs and clamping them together.

8. The heated rollers according to claim 7, wherein the clamping strip comprises has two generally parallel legs connected by a web at one end, where the legs are held in the indentations with screws.

9. The heated roller according to claim 8, wherein the clamping strip has at least one indentation for receiving a thread on the end face of the web.

10. The heated roller according to claim 1, further comprising a groove cut into a region of an inside surface of a respective element for receiving a temperature sensor.

11. The heated roller according to claim 10, wherein in addition to the groove for receiving the temperature sensor, at least one more groove having an undercut is provided for receiving an electrical current supply cable for the temperature sensor.

12. The heated roller according to claim 1, wherein the nonstick coating comprises polytetrafluoroethylene.

13. The heated roller according to claim 1, wherein the lightweight metal comprises aluminum or an alloy containing same.

14. The heated roller according to claim 1, wherein the distance between the outer and inner surface of the elements is between about 10 to about 40 mm.

15. The heated roller according to claim 1, wherein the series of connected elements includes six elements, which collectively define the tubular shape.

* * * * *